United States Patent
Yokoji et al.

(10) Patent No.: US 6,396,006 B1
(45) Date of Patent: May 28, 2002

(54) PRESSING AND ROTATING OPERATION TYPE ELECTRONIC PARTS AND COMMUNICATION TERMINAL EQUIPMENT USING THE ELECTRONIC PARTS

(75) Inventors: Shigeru Yokoji; Koji Tamano; Hiroshi Matsui, all of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/529,158

(22) PCT Filed: Aug. 18, 1999

(86) PCT No.: PCT/JP99/04425

§ 371 (c)(1),
(2), (4) Date: Jun. 29, 2000

(87) PCT Pub. No.: WO00/11693

PCT Pub. Date: Mar. 2, 2000

(30) Foreign Application Priority Data

Aug. 21, 1998 (JP) ............................................. 10-235192

(51) Int. Cl.⁷ .............................................. H01H 25/06
(52) U.S. Cl. ......................................... 200/4; 200/11 R
(58) Field of Search .......................... 200/4, 5 R, 6 R, 200/11 R, 14, 11 A, 11 D, 11 DA, 11 TW, 6 A, 6 C, 16 R, 16 A, 16 B, 16 C, 17 R, 18, 520, 564, 567, 570, 329, 336, 341

(56) References Cited

U.S. PATENT DOCUMENTS

| | | | |
|---|---|---|---|
| 5,369,230 A | * 11/1994 | Misawa | 200/52 R |
| 5,669,485 A | * 9/1997 | Painter et al. | 200/308 |
| 5,705,778 A | * 1/1998 | Matsui et al. | 200/11 R |
| 5,847,335 A | * 12/1998 | Sugahara et al. | 200/4 |
| 5,959,267 A | * 9/1999 | Kawasaki et al. | 200/4 |
| 6,124,555 A | * 9/2000 | Isikawa | 200/4 |

FOREIGN PATENT DOCUMENTS

| | | | |
|---|---|---|---|
| JP | 59-96618 | 6/1984 | ......... H01H/19/00 |
| JP | 4-14328 | 2/1992 | ......... H01H/25/00 |
| JP | 6-6431 | 6/1994 | ......... H01H/21/50 |
| JP | 6-88031 | 12/1994 | ......... H01H/25/00 |
| JP | 7-1713 | 1/1995 | ......... H01H/25/06 |
| JP | 8-17293 | 1/1996 | ......... H01H/25/00 |
| JP | 8-115641 | 5/1996 | ......... H01H/25/00 |
| JP | 8-167348 | 6/1996 | ......... H01H/25/00 |
| JP | 8-203387 | 8/1996 | ......... H01H/25/00 |
| JP | 9-7462 | 1/1997 | ......... H01H/25/00 |
| JP | 9-35583 | 2/1997 | ......... H01H/25/00 |
| JP | 2554359 | 7/1997 | ......... H01H/25/00 |
| JP | 10-64705 | 3/1998 | ......... H01C/10/00 |
| JP | 10-83741 | 3/1998 | ......... H01H/25/00 |
| JP | 10-149746 | 6/1998 | ......... H01H/25/00 |
| JP | 10-149748 | 6/1998 | ......... H01H/25/06 |
| JP | 10-199374 | 7/1998 | ......... H01H/25/00 |

OTHER PUBLICATIONS

Search Report corresponding to application No. PCT/JP99/04425 dated Nov. 30, 1999.
English translation of Form PCT/ISA/210, Dated Nov. 30, 1999.

* cited by examiner

Primary Examiner—Michael Friedhofer
(74) Attorney, Agent, or Firm—Ratner & Prestia

(57) ABSTRACT

A push and rotary operating type electronic device comprises a push switch unit 37 composed in a center of a bottom surface of a case 30, a rotary encoder unit 35 composed at a periphery of the push switch unit, a discoidal operating knob 39 mounted in a manner to be independently movable vertically, while also rotatable conjunctly with the rotary encoder unit 35, wherein the both component units 35 and 37 are operative by depression on a peripheral portion of the operating knob 39 during a rotary manipulation and a center portion of the same in a depressing manipulation. Communication terminal equipment uses this push and rotary operating type electronic device. This structure realizes a small projected area, and allows the rotary manipulation and the depressing manipulation by operating different portions of the single operating knob 39.

16 Claims, 14 Drawing Sheets

PRESSING AND ROTATING OPERATION TYPE ELECTRONIC PARTS AND COMMUNICATION TERMINAL EQUIPMENT USING THE ELECTRONIC PARTS

This application is a U.S. National Phase Application of PCT International Application PCT/JP99/04425.

FIELD OF THE INVENTION

The present invention relates to a push and rotary operating type electronic device equipped mainly in electronic equipment of various kinds, and capable of obtaining predetermined output signals, each corresponding to a rotating manipulation and a pushing manipulation of an operating knob. The invention also relates to communication terminal equipment using this push and rotary operating type electronic device.

BACKGROUND OF THE INVENTION

There has been increasing a number of electronic components having a variety of functions in recent years, with an advancement of electronic equipment of many kinds toward downsizing and higher performance. Among portable type communication terminal equipment, in particular, there has been an increase in number of the equipment, in which certain predetermined operations can be carried out by making a rotating manipulation as well as a pushing manipulation of a single operating knob. A demand has risen for the push and rotary operating type electronic device having such a function.

In order to comply with the foregoing demand, the applicant of the invention has proposed a rotary operating type electronic component equipped with a push switch as disclosed in Japanese Patent Laid-open Publication, Number H09-7462. With reference to FIG. 11 through FIG. 17, content of the publication will be described hereinafter, using a rotary operating type encoder equipped with a push switch as an example.

This rotary operation type encoder equipped with a push switch has a mount substrate 2 made of molding resin provided with three flexible contact legs 1 (1A, 1B and 1C) and a circular hole 2A, as shown in a plan view of FIG. 11 and cross sectional views of FIG. 12 and FIG. 13. The mount substrate 2 supports an actuating plate 3 in a swingable manner by holding a supporting column 3A in a circular cross section of the actuating plate 3 inserted in the circular hole 2A at a side of the mount substrate 2. In addition, a movable contact body 5 having a radially oriented contact plate 4, which is in contact resiliently with the flexible contact legs 1, is connected to and held rotatably by a cylindrical supporting column 3B on the actuating plate 3. A rotary encoder unit 6 (hereafter referred to as "encoder unit 6") is constructed of the above-described flexible contact legs 1 and the radially oriented contact plate 4.

A spring body 7 made of thin resilient metal sheet and a washer 8 are disposed on an upper portion of the supporting column 3B where the movable contact body 5 is rotatably connected, and they are caulkingly fixed upon an end of the supporting column 3B. A discoidal operating knob 9 is installed in a manner to cover an upper part of the supporting column 3B, and that it is rotatable with the movable contact body 5. The movable contact body 5, or the discoidal operating knob 9, stays still under an ordinary state, as a flexible detent 7A of the spring body 7 fits in a ditch of radially oriented ditches and ridges 5A (refer to a perspective view in FIG. 14) provided in an upper surface of the movable contact body 5.

The radially-oriented contact plate 4, with which three flexible contact legs 1A, 1B and 1C stay in resilient contact, has such a shape that linear-shaped contact portions 4B and insulated surfaces 4C are arranged alternately, as the linear-shape contact portions 4B are extended radially at regular angles from a central circular contact portion 4A, as shown in FIG. 11. The flexible contact leg 1A makes a resilient contact with the central circular contact portion 4A to serve as a common contact. The flexible contact legs 1B and 1C make resilient contact with the linear-shaped contact portions 4B and insulated surfaces 4C at positions slightly shifted in angle between them, so as to produce pulse signals having a difference in phase between them and the flexible contact leg 1A, i.e. the common contact. The flexible contact legs 1B and 1C stay still on one of the insulated surfaces 4C under the ordinary state as noted above, therefore the output signal of the encoder unit 6 remains turned off.

On the other hand, a push switch unit 12 (hereafter referred to as "switch unit 12") is disposed in a recess 11 having a back wall 10 (refer to a general perspective view of the mount substrate in FIG. 15) at one end of the mount substrate 2. A switch push head 3C provided on the actuating plate 3 is biased in a direction away from the switch unit 12, under the ordinary state, as it is pushed horizontally by a twisted coil spring 14 positioned in a pin stud 13 on the mount substrate 2.

FIG. 16 shows an example wherein the conventional rotary operating type encoder equipped with a push switch constructed as above is installed in communication terminal equipment. Supporting legs 2B under the mount substrate 2, terminals 15 connected to the flexible contact legs 1 of the encoder unit 6 and a terminal 16 of the switch unit 12 are inserted through mounting holes 18, 19 and 20 in a printed circuit board 17 of the equipment, and connected by soldering. The rotary operating type encoder is thus installed in a manner that the discoidal operating knob 9 mounted on the movable contact body 5 projects outward from a space in an outer case 21 of the communication terminal equipment at an opposite side of the switch unit 12.

Describing next is an operation of the conventional rotary operating type encoder equipped with a push switch constructed as above. When a projecting portion 9A of the discoidal operating knob 9 on the outer case 21 is rotated with a force applied in a tangential direction as shown by an arrow in FIG. 11, the movable contact body 5 rotates around the supporting column 3B of the actuating plate 3 as a center. This causes the flexible contact legs 1A, 1B and 1C on the mount substrate 2 to slide over the radially oriented contact plate 4 on an underside surface of the movable contact body 5, and produces an electric signal. This signal is lead to an outside by the integral terminals 15 of the flexible contact legs 1, and transferred to a circuit on the printed circuit board 17 in the communication terminal equipment. When the projecting portion 9A of the discoidal operating knob 9 is given a depressing force in a direction toward a center of the operating knob (direction of an arrow H1) against a biasing force of the twisted coil spring 14 on the mount substrate 2, as shown in FIG. 17, the actuating plate 3, i.e. the whole movable contact body 5, swings in a direction of an arrow H2 around the circular hole 2A of the mount substrate 2. This causes the switch push head 3C on the actuating plate 3 to push an operating button 12A of the switch unit 12, thereby operating the switch unit 12 to make en electrical connection between predetermined circuits on the printed circuit board 17. When the depressing force given to the discoidal operating knob 9 is removed, the actuating plate 3 is pushed back by a restoring force of the twisted coil spring 14 on the mount substrate 2, and the switch unit 12 resumes the state of FIG. 11, that is the OFF position.

However, the conventional rotary operating type encoder equipped with a push switch (push and rotary operating type electronic device) having the foregoing structure is such that the encoder unit 6 and the switch unit 12 are separately disposed in parallel on one of surfaces of the mount substrate 2. Therefore, although a thickness can be reduced, it increases a projected area, which makes it difficult to secure a space for mounting this device, as downsizing of the communication terminal equipment continues advancing. The device also bears a possibility of being operated erroneously, since a small force is applied in a direction of the arrow HI shown in FIG. 17, i.e. the direction of depressing manipulation, during a rotating manipulation of the device mounted on the communication terminal equipment. Moreover, it is liable to be operated by a thumb of a hand on a same side as the side where the projecting portion 9A of the discoidal operating knob 9 is disposed on a surface of the equipment during the manipulation. This has given rise to another problem that, for an operator holding the communication terminal equipment with an opposite side hand, it is not easy to use.

The present invention is intended to solve the foregoing problems of the prior art, and it aims at providing a push and rotary operating type electronic device that is small in projected area, capable of being operated by both a rotating manipulation and a pushing manipulation with a force applied to different positions on a discoidal operating knob, i.e. an operating body, less liable to an erroneous manipulation, and easy to use. The invention also aims at providing communication terminal equipment equipped with this push and rotary operating type electronic device.

SUMMARY OF THE INVENTION

A push and rotary operating type electronic device of the present invention includes: a case having an opening on top, provided with a first stationary contact for a push type component in a center of a bottom surface and a second stationary contact for a rotary type component at a peripheral portion of the first stationary contact; a push type movable contact disposed above the first stationary contact for constituting the push type component in combination with the first stationary contact; a movable contact body provided with a rotary type movable contact on an underside surface of a flange portion of a rotatably supported cylindrical portion, for contacting with the second stationary contact, the movable contact body constituting the rotary type component in combination with the second stationary contact; an actuator inserted in and supported by a central through hole in the cylindrical portion of the movable contact body in a manner that the actuator is rotatable conjunctly with the movable contact body with respect to the case, while it is also independently movable in a vertical direction, for actuating the push type component when depressed downwardly; an operating body of a discoidal shape having a connecting portion to the actuator in a center of an underside surface; and a cover having a flat portion for covering the opening on top of the case and a bearing hole in a center of the flat portion for rotatably supporting the cylindrical portion of the movable contact body.

In addition, communication terminal equipment of the present invention is equipped with the push and rotary operating type electronic device having the above-described structure.

The foregoing structure of this invention can realize miniaturization of an electronic component, since it provides a combination of the push type component and the rotary type component within a small projected area. In addition, the invention offers a push and rotary operating type electronic device that is less liable to an erroneous manipulation and easy to operate, since it is capable of being operated by a force applied to a single operating body of a discoidal shape at different positions respectively when making a rotating manipulation and a pushing manipulation. The invention also offers communication terminal equipment quipped with the push and rotary operating type electronic device.

DESCRIPTION OF THE PREFERRED EMBODIMENTS

Figure 1:
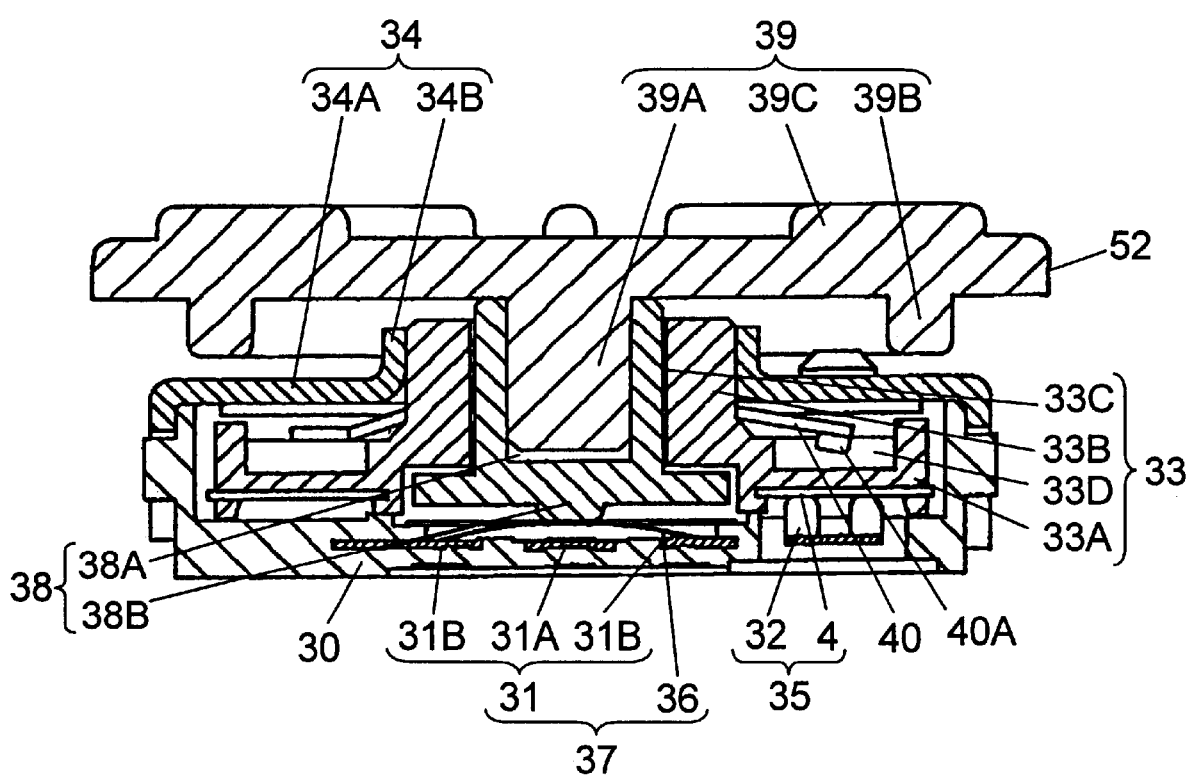
FIG. 1 is a cross sectional view depicting a rotary operating type encoder equipped with a push switch, representing a push and rotary operating type electronic device of a first exemplary embodiment of the present invention.

A push and rotary operating type electronic device of the preferred exemplary embodiments of the invention and communication terminal equipment using the same device will be described hereinafter, using a rotary operating type encoder equipped with a push switch as a representative, in the same manner as in the case of the prior art device.

Since certain components similar to those described in the previous section for the prior art technique have similar functions, they are assigned the same reference numerals and their description will be omitted.

First Exemplary Embodiment

FIG. 1 is a cross sectional view of a rotary operating type encoder equipped with a push switch, representing a push and rotary operating type electronic device of a first exemplary embodiment of this invention. A case 30 made of insulating resin has an opening on top of it as shown in FIG. 1. There are a central stationary contact 31A and a peripheral stationary contact 31B in a center portion, and a flexible contact 32 made of a thin metal sheet at a peripheral area of an inner bottom surface of the opening in the case 30, all fixed by insert molding. The central stationary contact 31A and the peripheral stationary contact 31B constitute a first stationary contact, which serves as a stationary contact 31 for a push switch unit 37 (i.e. a push type component). The flexible contact 32 represents the second stationary contact for a rotary encoder unit (i.e. a rotary type component). A movable contact body 33 secures a radially oriented contact plate 4 defining a rotary-type movable contact, which is in contact with the flexible contact 32, on an underside surface of a flange portion 33A. Since the radially oriented contact plate 4 has a structure similar to that depicted in FIGS. 11 through 17, detailed drawing is omitted. A cylindrical portion 33B of the movable contact body 33 is held rotatably in a bearing hole 34B of a cover 34. The cover 34 is mounted in a manner to cover the opening of the case 30 with a flat portion 34A having a plane upper surface. A rotary encoder unit 35 (hereafter referred to as "encoder unit 35") defining a rotary type component includes the flexible contact 32 and the radially oriented contact plate 4.

A dome shape movable contact 36 serving as a push type movable contact is disposed on the peripheral stationary contact, 31B of the case 30. A push switch unit 37 (hereafter referred to as "switch unit 37") defining a push type component includes the central stationary contact 31A, the peripheral stationary contact 31B, and the dome shape movable contact 36. An actuator 38 is disposed above the movable contact 36 for activating the switch unit 37. The actuator 38 is inserted and held with a small clearance in a central through hole 33C of a non-circular shape provided in a center of the cylindrical portion 33B of the movable contact unit 33, in a manner that a lower end projection 38B confronts a center of the movable contact 36. The clearance is provided to such an extent that the actuator 38 is independently movable vertically, while it is also rotatable conjunctly with the movable contact body 33. A lower column 39A acting as a connecting portion of a discoidal operating knob 39, serving as an operating body, is press-fitted in an upper hole 38A of the actuator 38. Therefore, the actuator 38 and the operating knob 39 are connected integrally for a linked motion.

Figure 2:
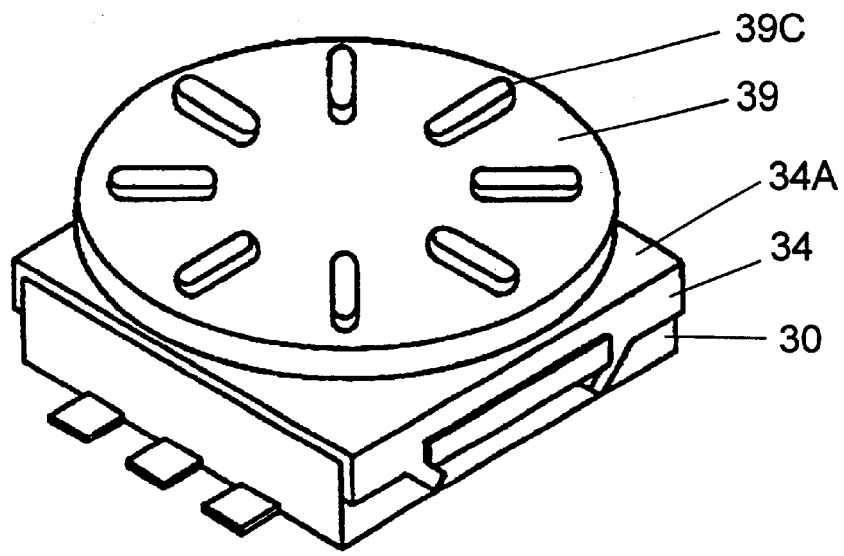
FIG. 2 is a general perspective view depicting the same rotary operating type encoder equipped with a push switch.

The discoidal operating knob 39 is provided on its underside peripheral surface with an annular shape skirt rib 39B with a small space to the flat portion 34A of the cover 34. The operating knob 39 is also provided on its upper peripheral surface with radially oriented ditches and ridges 39C (refer to a general perspective view in FIG. 2).

The rotary operating type encoder equipped with a push switch of the foregoing structure operates in a manner as described below. When the operating knob 39 is subjected to a rotary manipulation with a hand, for example holding its periphery, the operating knob 39, the actuator 38, and the movable contact body 33 rotate together in one united body. With this rotation, the encoder unit 35 produces a pulse signal corresponding to an amount of the rotation, as the flexible contact 32 mounted on the case 30 slides resiliently over the radially oriented contact plate 4 fixed to the movable contact body 33.

Figure 3:
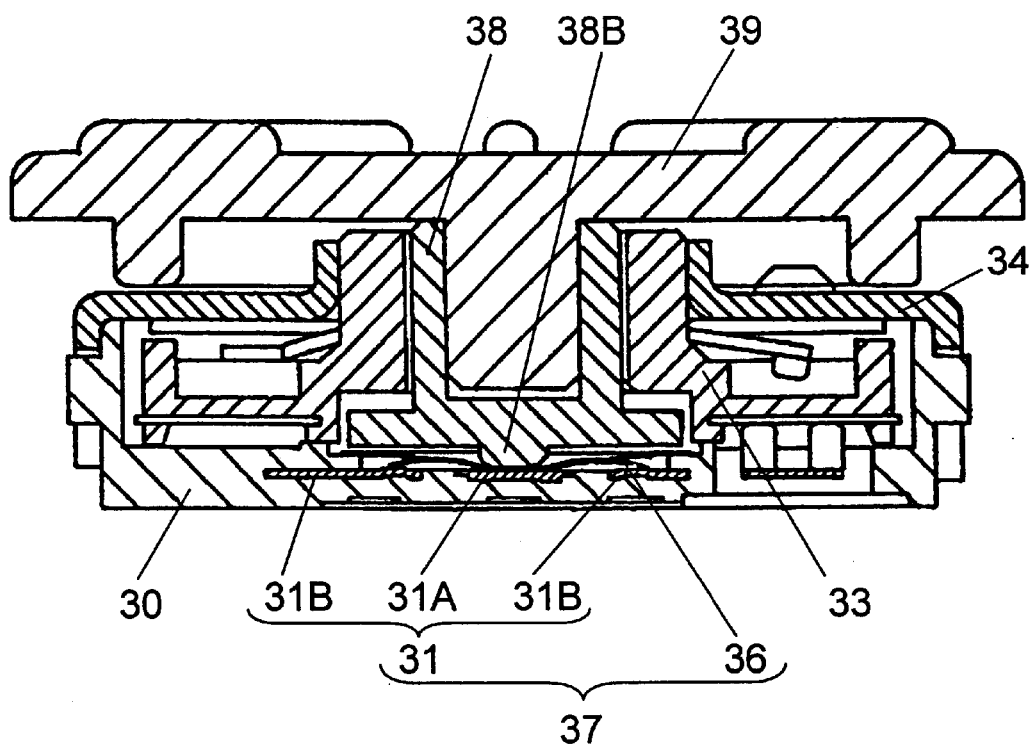
FIG. 3 is a cross sectional view of the same rotary operating type encoder equipped with a push switch, showing a state wherein it is being depressed.

When an upper surface of the operating knob 39 is subjected to a depressing manipulation vertically downward at a center portion, where the radially oriented ditches and ridges 39C are not formed, the operating knob 39 and the actuator 38 shift downward conjunctly in one piece, but independently of the movable contact body 33, as shown in a cross sectional view of FIG. 3. The movable contact 36 deforms when the depressing force given to the dome shape movable contact 36 by the lower end projection 38B of the actuator 38 becomes greater than a predetermined magnitude, thereby making an electrical continuity between the central stationary contact 31A and the peripheral stationary contact 31B on the case 30. When the depressing force to the operating knob 39 is removed, the movable contact 36 regains the original shape by a resilient restoring force of its own, so as to open electrically between the central stationary contact 31A and the peripheral stationary contact 31B. The movable contact 36 also pushes the operating knob 39 and actuator 38 upwardly, and resumes the state shown in FIG. 1.

Figure 4:
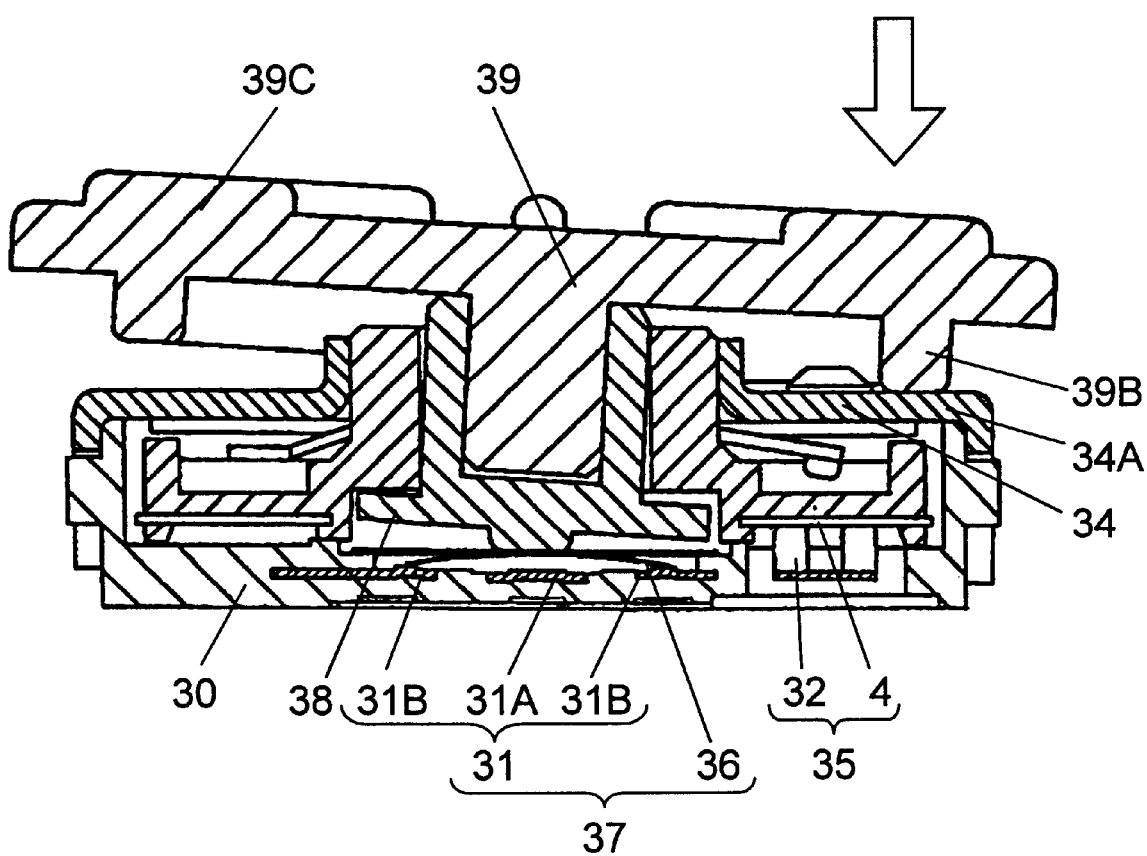
FIG. 4 is another view of the same rotary operating type encoder equipped with a push switch, showing a state wherein a periphery of an upper surface of an operating knob is depressed downward during a rotary manipulation.

This rotary operating type encoder equipped with a push switch is also capable of being operated with a tip of a finger, etc., making a rotary manipulation while pushing an upper peripheral surface of the discoidal operating knob 39 downwardly. In the case of rotary manipulation, the operating knob 39 can be rotated with the tip of finger, etc. catching the radially oriented ditches and ridges 39C provided on the upper peripheral surface of the operating knob 39 without skidding. When the upper peripheral surface of the operating knob 39 is strongly depressed downward during this rotary manipulation, the operating knob 39 tilts only by an amount of the space between a bottom end surface of the skirt rib 39B corresponding to the above depressed portion and the upper surface of the flat portion 34A of the cover 34, as shown in a cross sectional view of FIG. 4. This makes the operating knob 39 to rotate while causing the bottom end surface of the skirt rib 39B to slide on the flat portion 34A of the cover 34, hence achieving a stable and smooth rotational operation.

Figure 14:
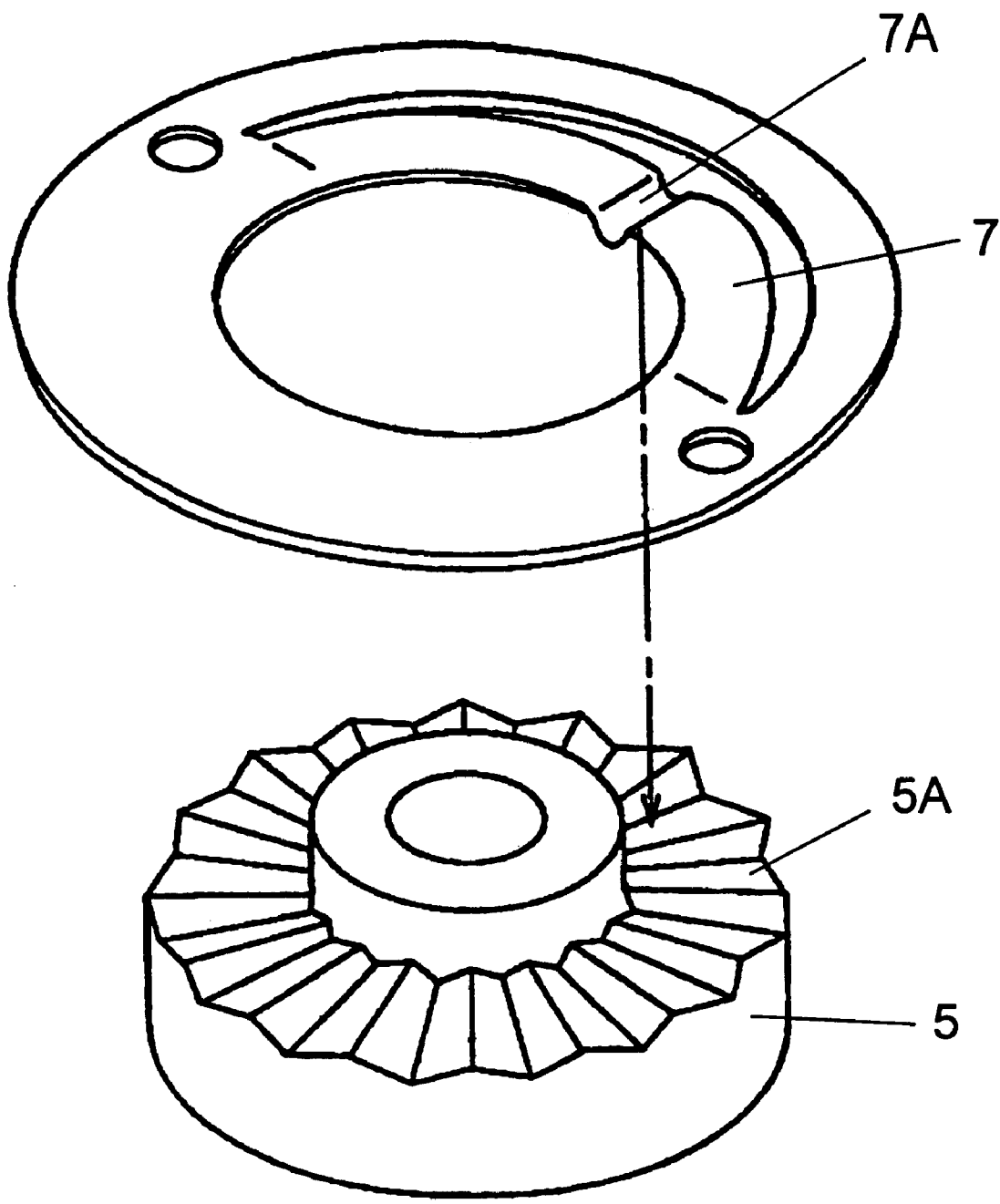
FIG. 14 is a perspective view depicting a movable contact body and a spring body of the same rotary operating type encoder equipped with a push switch of the prior art.
Figure 15:
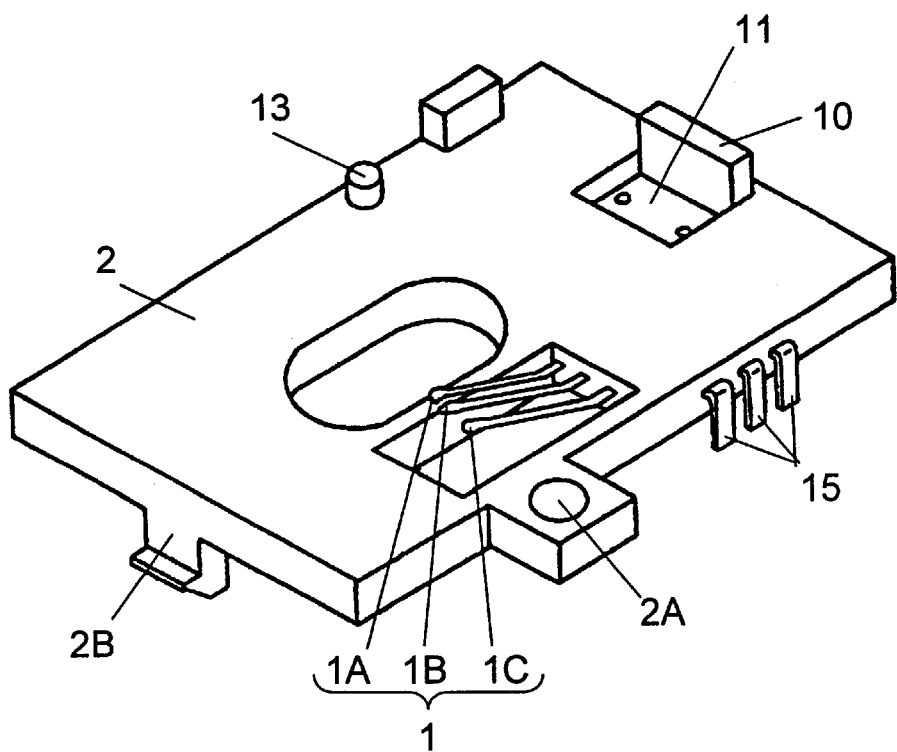
FIG. 15 is perspective view depicting a mount substrate of the same rotary operating type encoder equipped with a push switch of the prior art.
Figure 16:
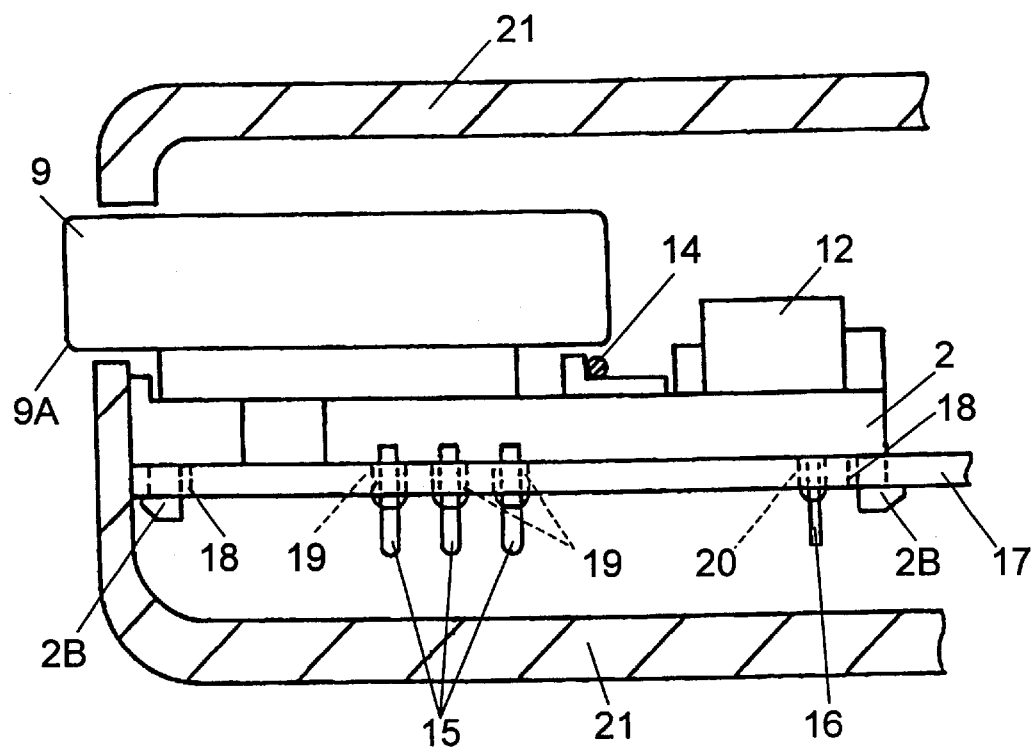
FIG. 16 is a sectional view of a portion of communication terminal equipment employing the same rotary operating type encoder equipped with a push switch of the prior art.
Figure 17:
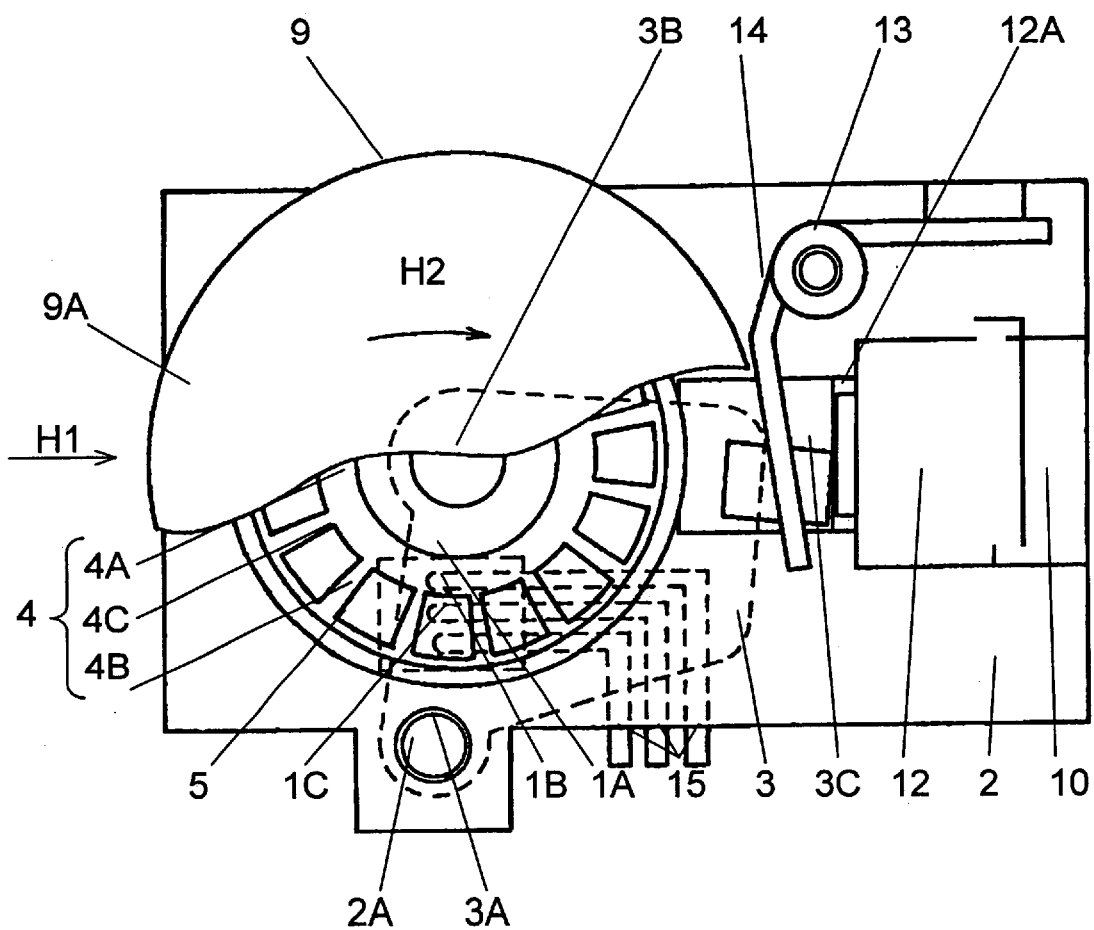
FIG. 17 is a plan view of the same rotary operating type encoder equipped with a push switch of the prior art, showing a state wherein it is being depressed

The above-described rotary operating type encoder equipped with a push switch is also provided with ditches and ridges 33D for yielding tactile response, similar to the ditches and ridges 5A shown in FIG. 14, on an upper surface of the flange portion 33A of the movable contact body 33, and a spring body 40 mounted on a back surface of the cover 34 for making a resilient contact with the ditches and ridges 33D to yield tactile response. During the rotary manipulation, of the operating knob 39, a detent 40A of the spring body 40 slides resiliently over the ditches and ridges 33D for tactile response, thereby yielding positive tactile response in the same way as in the case of the prior art techniques.

Accordingly, the rotary operating type encoder equipped with a push switch (push and rotary operating type electronic device) of the present exemplary. embodiment can be composed into a small projected area, since it has such a compact structure that the switch unit 37 (push type component) is disposed in the center of the encoder unit 35 (rotary type component) formed in an annular shape structure. The rotary type component can be operated by making a rotary manipulation of the upper peripheral surface of a single discoidal operating knob 39, and the push type component by depressing vertically the upper central surface of the same operating knob 39.

Figure 5:
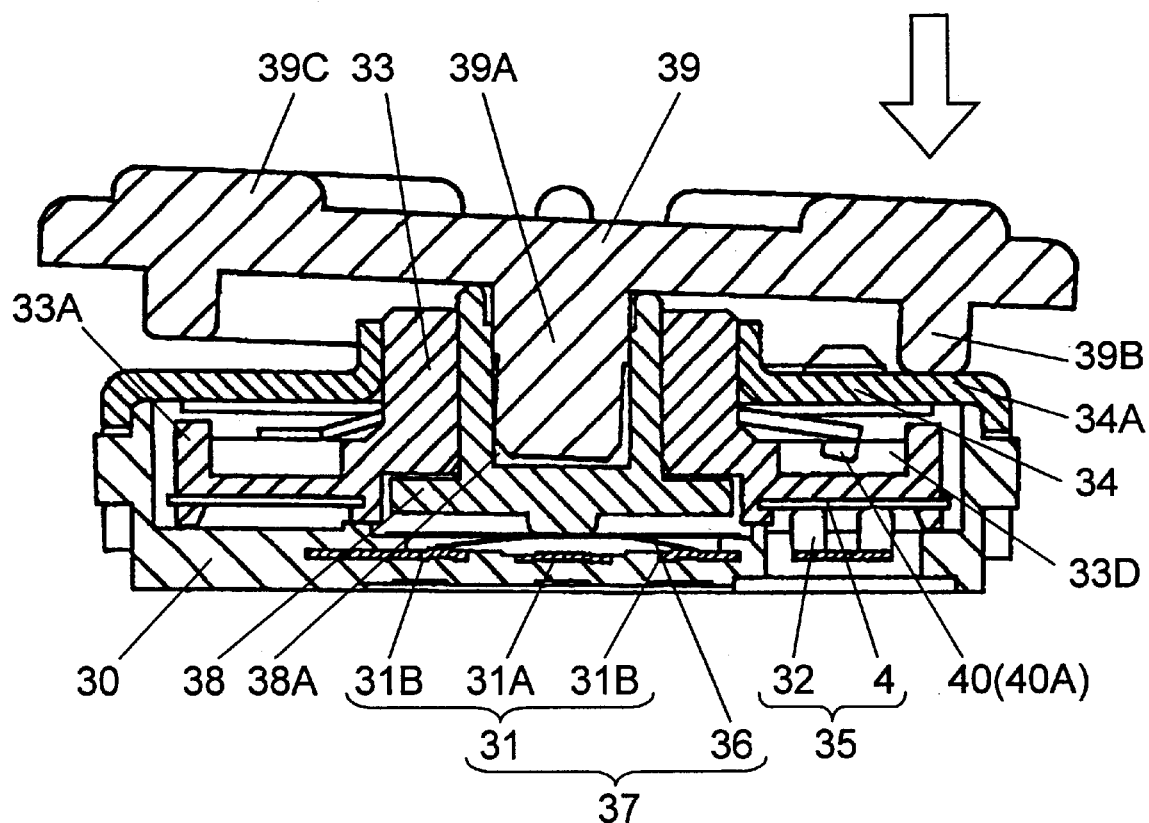
FIG. 5 is still another view of the same rotary operating type encoder equipped with a push switch, wherein a predetermined clearance is provided in a connecting portion between an actuator and the operating knob, showing a state in a rotary manipulation.

The rotary operating type encoder equipped with a push switch of the present exemplary embodiment can be so constructed that a lower part of the lower column 39A of the discoidal operating knob 39 formed in a small diameter is connected to an upper part of the upper hole 38A made in a larger diameter in the actuator 38. In other words, they are connected with provision of predetermined clearances at both the upper part and the lower part of press-fitted connecting portion between them as shown in a cross sectional view of FIG. 5. This structure allows the operating knob 39 to tilt easily up to a certain angle, and realizes superior operability when making a rotary manipulation of the operating knob 39 while depressing its upper peripheral surface downward from the above.

Although the discoidal operating knob 39 of the rotary operating type encoder equipped with a push switch of this exemplary embodiment is provided with the radially oriented ditches and ridges 39C on its upper peripheral surface, a similar effect can be attained with provision of a plurality of projections or dimples in place of the ditches and ridges.

Moreover, the rotary operating type encoder equipped with a push switch of this exemplary embodiment can be made easier to operate with a tip of a finger, etc., if it is provided with ditches and ridges on a peripheral rim 52 (FIG. 1) of the discoidal operating knob 39.

Second Exemplary Embodiment

Figure 6:
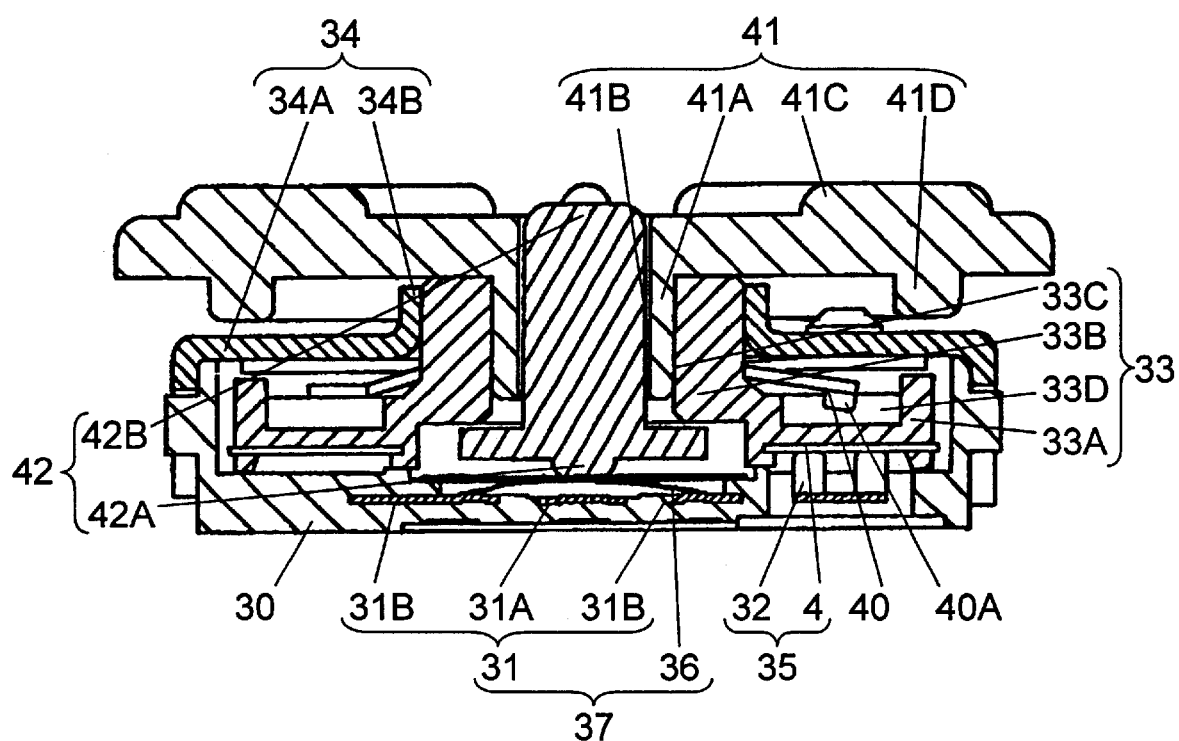
FIG. 6 is a cross sectional view depicting a rotary operating type encoder equipped with a push switch, representing a push and rotary operating type electronic device of a second exemplary embodiment of the present invention.

FIG. 6 is a cross sectional view of depicting a rotary operating type encoder equipped with a push switch of the present exemplary embodiment. As shown in FIG. 6, it is provided with a central stationary contact 31A and a peripheral stationary contact 31B to constitute a stationary contact 31 for a switch unit 37 in a center portion of inside of the bottom surface of a case 30 having an opening on top, and a flexible contact 32 for an encoder unit 35 in a peripheral portion of it. The switch unit 37 includes the stationary contact 31 and a dome shaped movable contact 36 disposed above the stationary contact 31. A movable contact body 33 provided with a radially oriented contact plate 4 fixed to an underside surface of its flange portion 33A is held rotatably by fitting a cylindrical portion 33B of it in a bearing hole 34B of a cover 34. The encoder unit 35, i.e. a rotary type component includes a flexible contact 32 and the radially oriented contact plate 4. The foregoing structure is same as that of the encoder equipped with a push switch of the first exemplary embodiment. However, the rotary operating type encoder equipped with a push switch of the present exemplary embodiment includes the movable contact body 33 having a non-circular central through hole 33C, in which a lower column 41A, serving as a connecting portion, of an annular shape operating knob 41 is connected movably in a linked motion. An actuator 42 in a shape of a cylindrical rod for activating the switch unit 37 is mounted with a small clearance in a circular central through hole 41B of the lower column 41A, in a manner that it only moves downward while being restricted from sliding out upward, that its lower end projection 42A confronts a center of the movable contact 36, and further that its upper end 42B protrudes slightly above an upper surface of the operating knob 41.

The rotary operating type encoder of this exemplary embodiment is similar to that of the first exemplary embodiment in respect of other constructions such that: the annular shape operating knob 41 is provided with radially oriented ditches and ridges 41C on an upper surface, and a skirt rib 41D on an underside surface; and a detent 40A of the spring body 40 for yielding tactile response attached to an underside surface of the cover 34 makes a resilient contact with ditches and ridges 33D provided on an upper surface of a flange portion 33A of the movable contact body 33 for yielding tactile response.

The rotary operating type encoder equipped with a push switch of the foregoing structure operates in a manner as described below. When the annular shape operating knob 41 serving as an operating body is subjected to a rotary manipulation, the operating knob 41 and the movable contact body 33 rotate conjunctly in one united body. This causes the flexible contact 32 fixed to the case 30 slides resiliently over the radially oriented contact plate 4 to produce an electric signal corresponding to an amount of the rotation.

Figure 7:
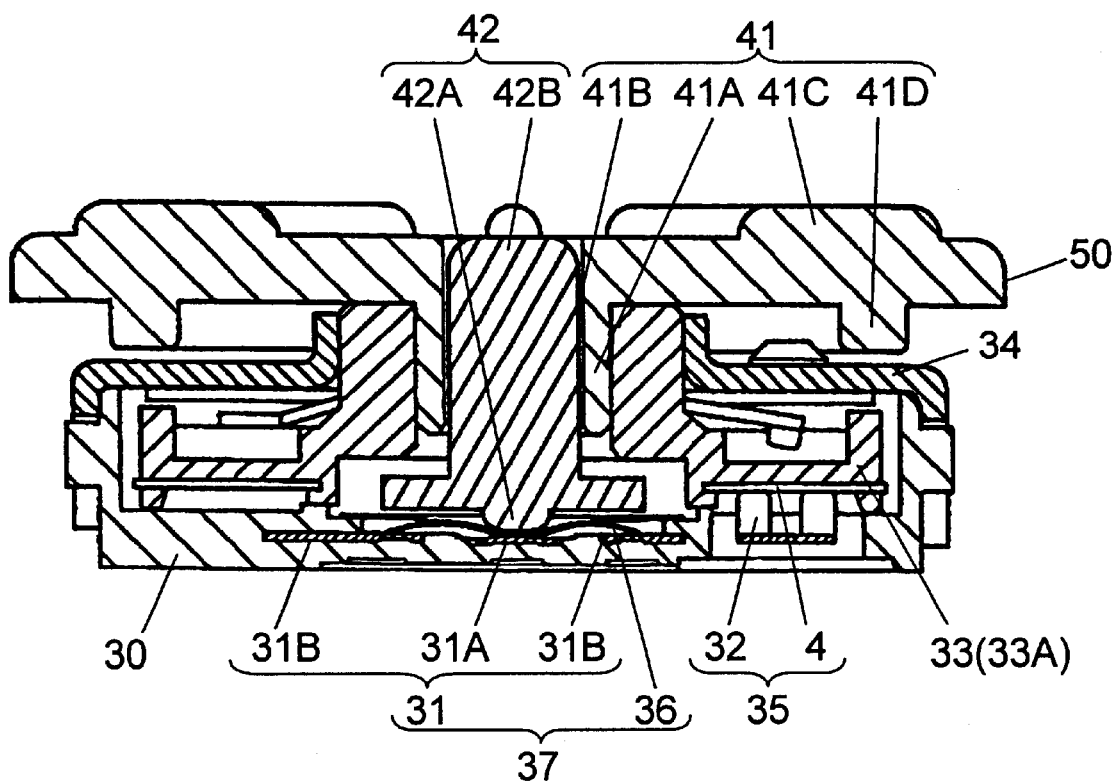
FIG. 7 is a cross sectional view of the same rotary operating type encoder equipped with a push switch, showing a state wherein it is being depressed.

When the upper end 42B of the actuator 42, protruding in the center above the upper surface of the operating knob 41 is depressed, as shown in a cross sectional view in FIG. 7, the lower end projection 42A of the actuator 42 places a thrusting force and deforms the movable contact 36, whereas the operating knob 41 remains still. This causes the movable contact 36 to make a connection, i.e. an electrical continuity, between the central stationary contact 31A and the peripheral stationary contact 31B. When the depressing force is removed from the actuator 42, the movable contact 36 restore its original shape, opens the stationary contact 31 electrically, and pushes up the actuator 42 to the original position to reestablish the state shown in FIG. 6.

While depressing the annular operating knob 41 by catching the radially oriented ditches and ridges 41C on the upper surface with a tip of a finger, etc., the operating knob 41 tilts slightly, so that it is rotated while making a bottom end surface of the skirt rib 41D corresponding to the depressed portion to contact and slide on a flat portion 34A of the cover 34, thereby achieving a good rotary operation in the same manner as in the case of the first exemplary embodiment. During this manipulation, the actuator 42 also tilts and rotates together with the operating knob 41.

As has been described, the rotary operating type encoder equipped with a push switch of this exemplary embodiment has such a structure, providing different operating members, i.e. the operating knob 41 and the actuator 42, within a projected area of the single annular operating knob 41, and that a rotary manipulation of the operating knobs 41 can operate the encoder unit 35 and a depressing manipulation of the actuator 42 can operate the switch unit 37. Accordingly, this structure can effectively reduce erroneous manipulations between the two.

By protruding the upper end 42B of the actuator 42 slightly above the upper surface of the operating knob 41, as described above, the encoder equipped with a push switch becomes easy to operate when manipulated with a tip of a finger, or the like. However, the actuator 42 may be so constructed that the upper end 42B stays slightly below the upper surface of the operating knob 41, and the upper end 42B situating inside of the central through hole 41B in the operating knob 41 may be manipulated by depressing it with a separate member, as a matter of course.

In the encoder equipped with a switch of the present exemplary embodiment, although the discoidal operating knob 41 is provided with the radially oriented ditches and ridges 41C on the upper peripheral surface, a similar effect can be realized with provision of a plurality of projections or dimples in place of the ditches and ridges.

Moreover, the rotary operating type encoder equipped with a push switch of this exemplary embodiment can be made easier to operate with a tip of a finger, etc., if it is provided with ditches and ridges on a peripheral rim 50 of the annular operating knob 41.

Furthermore, the first and the second exemplary embodiments described above represent an example, in which the switch unit includes the first stationary contact disposed in the center portion on the bottom surface of the case and the push type movable contact disposed above the first stationary contact. However, a switch unit of any other structure may be disposed in the center portion on the bottom surface of the case.

Third exemplary embodiment

Figure 8A:
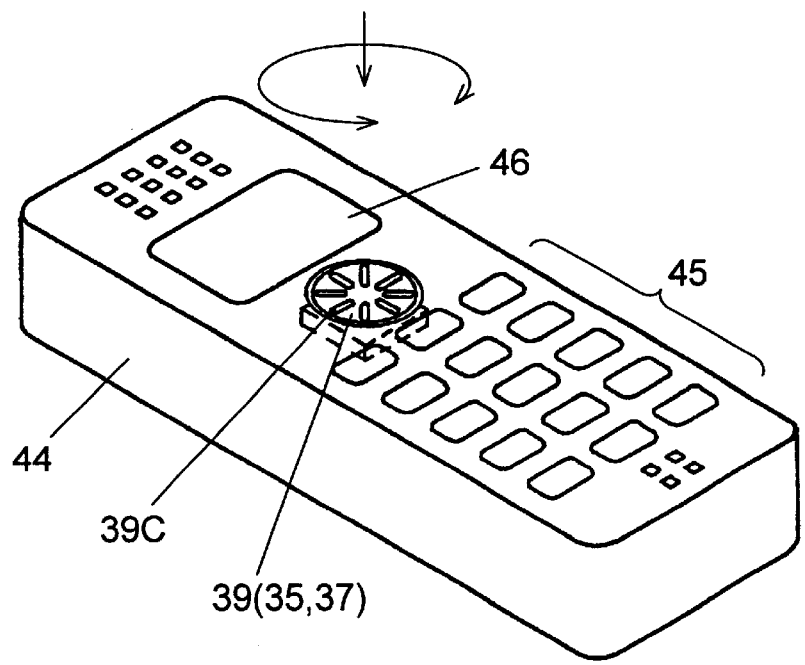
FIG. 8A is a general perspective view depicting communication terminal equipment of a third exemplary embodiment of the present invention.
Figure 8B:
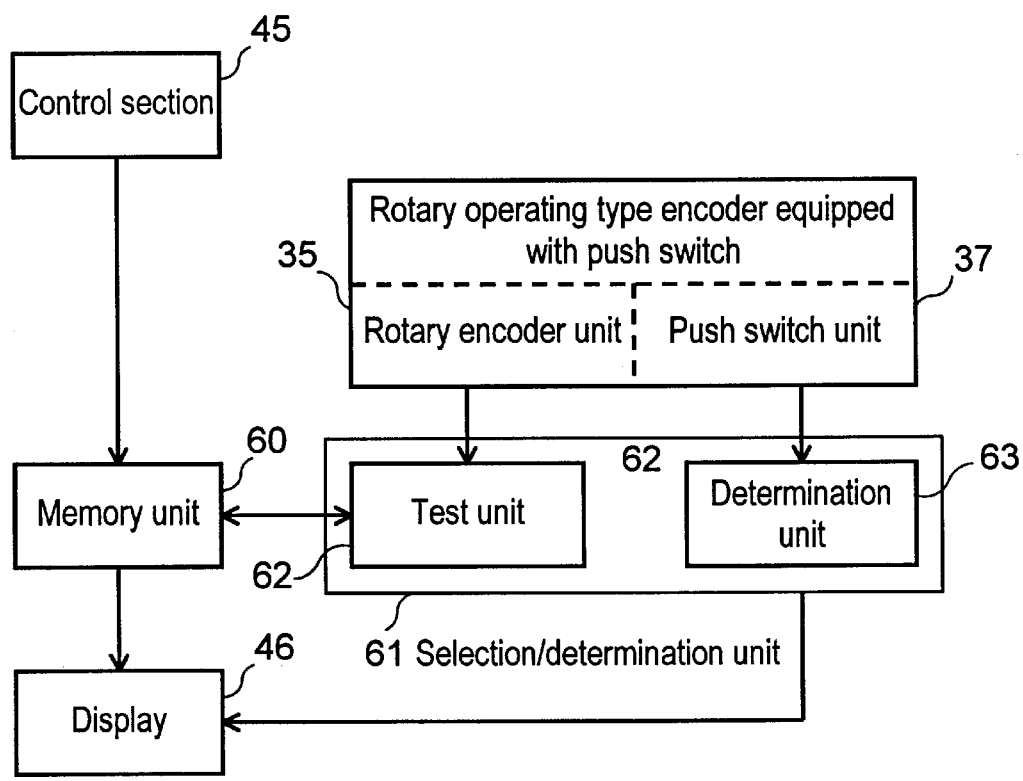
FIG. 8B is a block diagram of the same equipment.

Communication terminal equipment of a third exemplary embodiment of the present invention will be described hereinafter by referring to a general perspective view in FIG. 8A and a block diagram in FIG. 8B. A main body 44 provides on its upper surface with a control section 45 for accepting a number of manipulations, and a display 46 capable of displaying a predetermined item, menu, and so on. The main body 44 also carries a push and rotary operating type electronic device (rotary operating type encoder equipped with a push switch) of the first exemplary embodiment with an entire upper surface of an operating knob 39, i.e. an operating body, exposed in a center position between the control section 45 and the display 46.

With the communication terminal equipment of this exemplary embodiment, an operator makes a rotary manipulation of the operating knob 39 of the rotary operating type encoder equipped with a push switch while depressing an upper peripheral surface of it, after making the display 46 to show a predetermined item, menu, and the like by making a predetermined manipulation with the control section 45, etc. This communication terminal equipment has a retrieving unit 62 for making the display 46 to sequentially display predetermined data retrieved from a memory unit 60, wherein a plurality of data such as text information and telephone numbers are stored, using an output signal obtained from the encoder unit 35 by the foregoing manipulation, as shown in the block diagram of FIG. 8B. The operator depresses an upper center portion of the operating knob 39 of the rotary operating type encoder equipped with a push switch vertically downward, when he finds a desired data or item on the display. The communication terminal equipment has a determination unit 63 for determining the desired data using an output signal obtained from the switch unit 37 by the foregoing manipulation. In other words, this communication terminal equipment is provided with a selection/determination unit 61 including the retrieving unit 62 and the determination unit 63.

Accordingly, the communication terminal equipment of this exemplary embodiment is capable of smoothly retrieving and determining a required information only with a rotary manipulation and a depressing manipulation of the single operating knob 39, since the output signal produced by the rotary manipulation or the depressing manipulation of the rotary operating type encoder equipped with a push switch is individually assigned for a data retrieving function or a determining function. The rotary operating type encoder equipped with a push switch used in the present communication terminal equipment is manipulable while the operating knob 39 is being depressed downward at the upper peripheral surface during the rotary manipulation. Therefore, the operating knob 39, i.e. the rotary operating type encoder equipped with a push switch, can be mounted in a center portion of the main body 44. The foregoing structure can realize the communication terminal equipment that is easy to operate with either of a right hand and a left hand, regardless of a right-handed or a left-handed person.

This rotary operating type encoder equipped with a push switch is superior in rotational operability, and less likely to be operated erroneously between the rotary manipulation and the depressing manipulation, as described in detail in the first exemplary embodiment, since the operating knob 39 is provided with the radially oriented ditches and ridges 39C on the upper peripheral surface.

The communication terminal equipment of this exemplary embodiment represents an example, in which an output signal of the switch unit 37 of the rotary operating type encoder equipped with a push switch is used for the determination function. However, the output signal can be used as an execution signal as a matter of course.

In addition, although the present exemplary embodiment described above is an example, in that the communication terminal equipment carries the rotary operating type encoder equipped with a push switch (push and rotary operating type electronic device) of the first exemplary embodiment, a similar effect can be anticipated even if it is equipped with a rotary operating type encoder equipped with a push switch of the second exemplary embodiment. Moreover, if the communication terminal equipment takes a structure using the rotary operating type encoder equipped with a push switch of the above exemplary embodiment, it allows manipulation of the operating knob 41 and the actuator 42, each composed of different component, for the rotary manipulation and the depressing manipulation individually, thereby achieving a further reduction of erroneous manipulations between them.

Fourth Exemplary Embodiment

Figure 9:
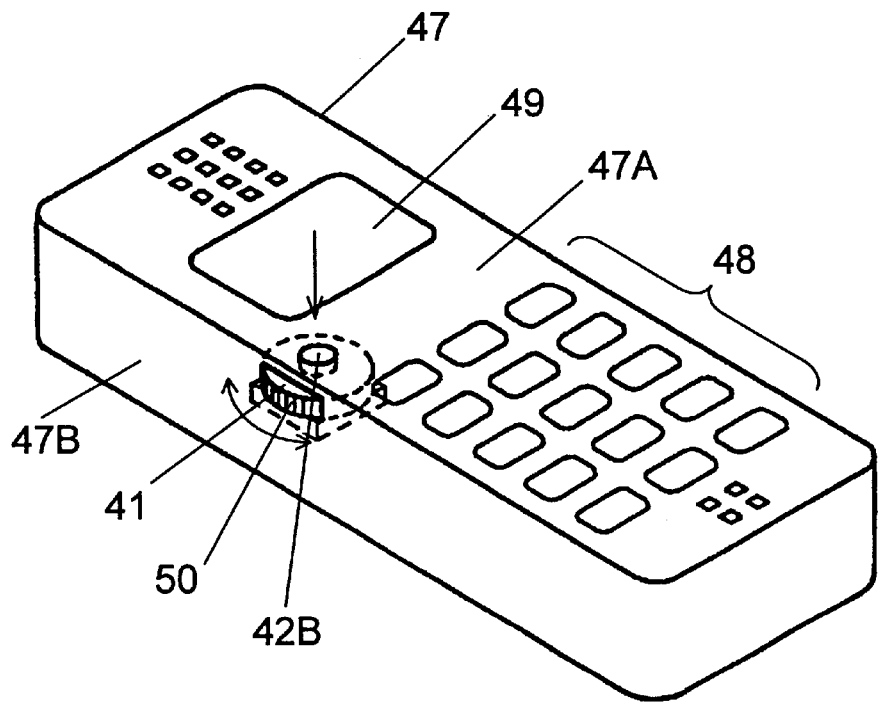
FIG. 9 is a general perspective view depicting communication terminal equipment of a fourth exemplary embodiment of the present invention.

Communication terminal equipment of a fourth exemplary embodiment of the present invention will be described hereinafter by referring to a general perspective view in FIG. 9.

The communication terminal equipment of this exemplary embodiment is provided with a control section 48 for accepting a number of manipulations and a display 49 capable of displaying a predetermined item, menu, etc., on an upper surface 47A of a main body 47. A push and rotary operating type electronic device (rotary operating type encoder equipped with a push switch) described in the second exemplary embodiment is mounted in a manner that an upper end 42B of an actuator 42 and a peripheral rim 50 of an operating knob 41 protrude from an upper surface 47A and an adjoining side surface 47B of the main body 47 respectively. Output signals produced during a rotary manipulation and a depressing manipulation of the rotary operating type encoder equipped with a push switch are assigned individually for a data retrieval and a determination function (or an execution function), in the same manner as in the case of the third exemplary embodiment. Since other parts are also same as those of the third exemplary embodiment, their description will be omitted.

Operation of the communication terminal equipment of this exemplary embodiment will now be described briefly. With this communication terminal equipment, data is retrieved by rotating the operating knob 41 with a force applied in a tangential direction to the peripheral rim 50 protruding from the side surface 47B. The upper end 42B of the actuator 42 protruding from the upper surface 47A of the main body 47 is depressed to determine or execute a desired data, when the desired data is shown in the display 49.

As described above, the communication terminal equipment of this exemplary embodiment is able to provide with manipulating portions on two adjoining surfaces of the main body 47 individually by installing only one rotary operating type encoder equipped with a push switch having a small projected area. This structure easily realizes the communication terminal equipment of a small size, light weight, and a minimal erroneous operation between the rotary manipulation and the depressing manipulation, since the two manipulating portions can be used individually for the rotary manipulation and the depressing manipulation.

In the present exemplary embodiment, although the communication terminal equipment as described above is an example having the structure that the upper end 42B of the actuator 42 is protruded from the upper surface 47A of the main body 47 for a direct manipulation, the actuator 42 may be so constructed that it is depressed via a separate member. Alternatively, a rotary operating type encoder equipped with a push switch of the first exemplary embodiment may be installed to constitute such a structure that it is depressible with another member. In addition, it is obvious that the two adjoining surfaces of the main body 47, wherein the rotary operating type encoder equipped with a push switch is disposed, need not be limited to any particular surfaces.

Fifth Exemplary Embodiment

Figure 10:
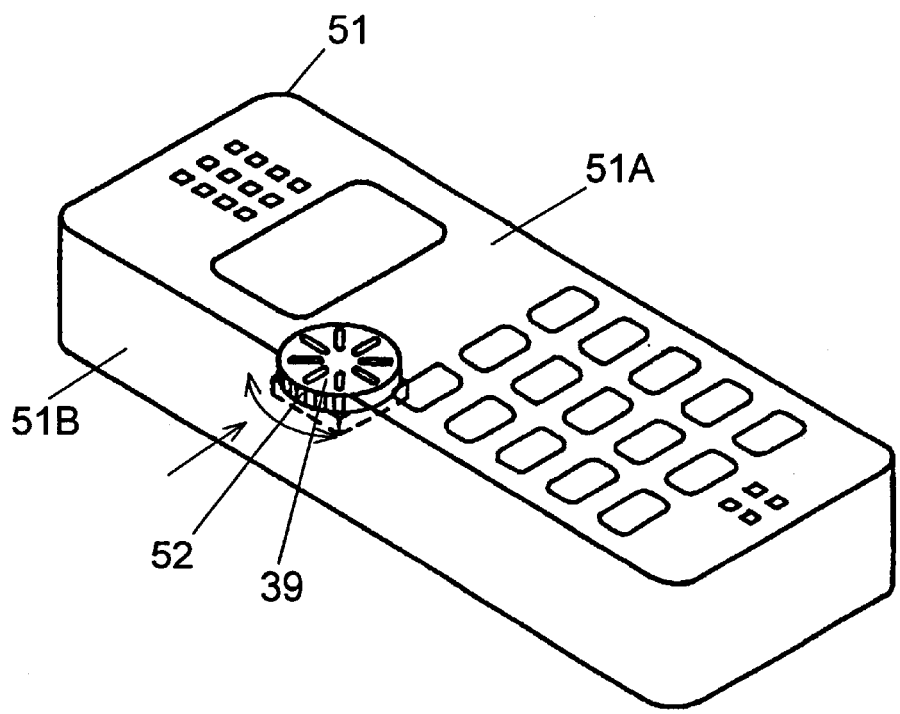
FIG. 10 is a general perspective view depicting communication terminal equipment of a fifth exemplary embodiment of the present invention.
Figure 11:
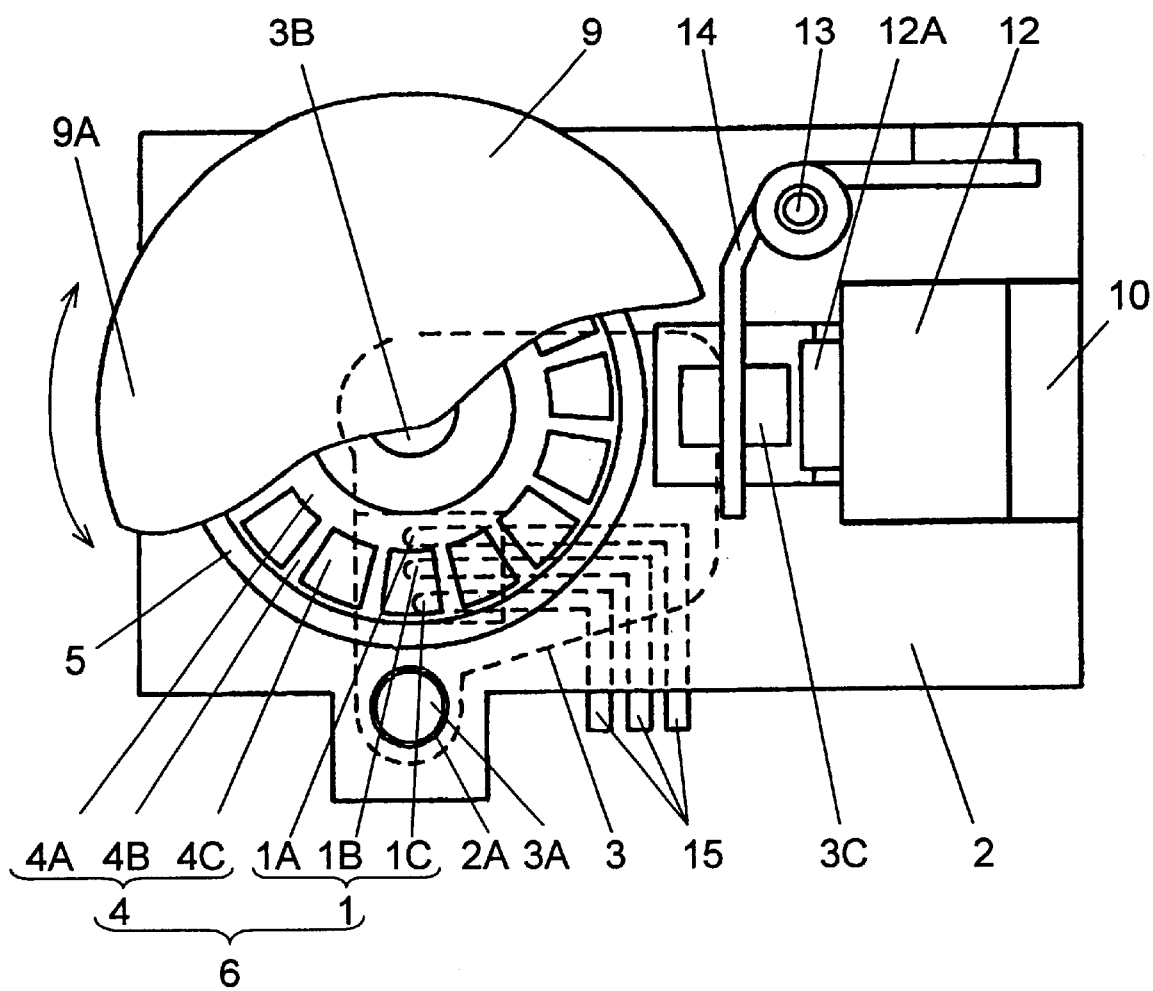
FIG. 11 is a plan view depicting a rotary operating type encoder equipped with a push switch, representing a push and rotary operating type electronic device of the prior art.
Figure 12:
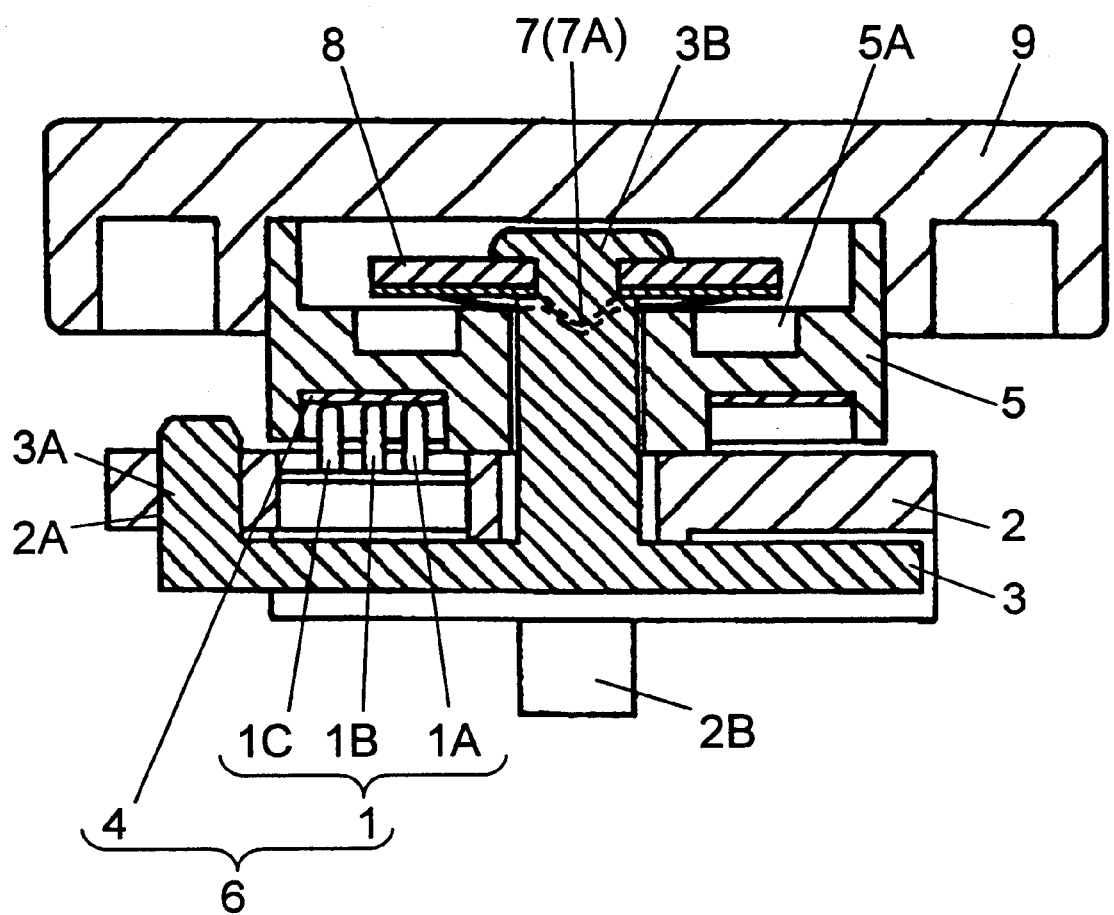
FIG. 12 is a cross sectional view of the same rotary operating type encoder equipped with a push switch of the prior art.
Figure 13:
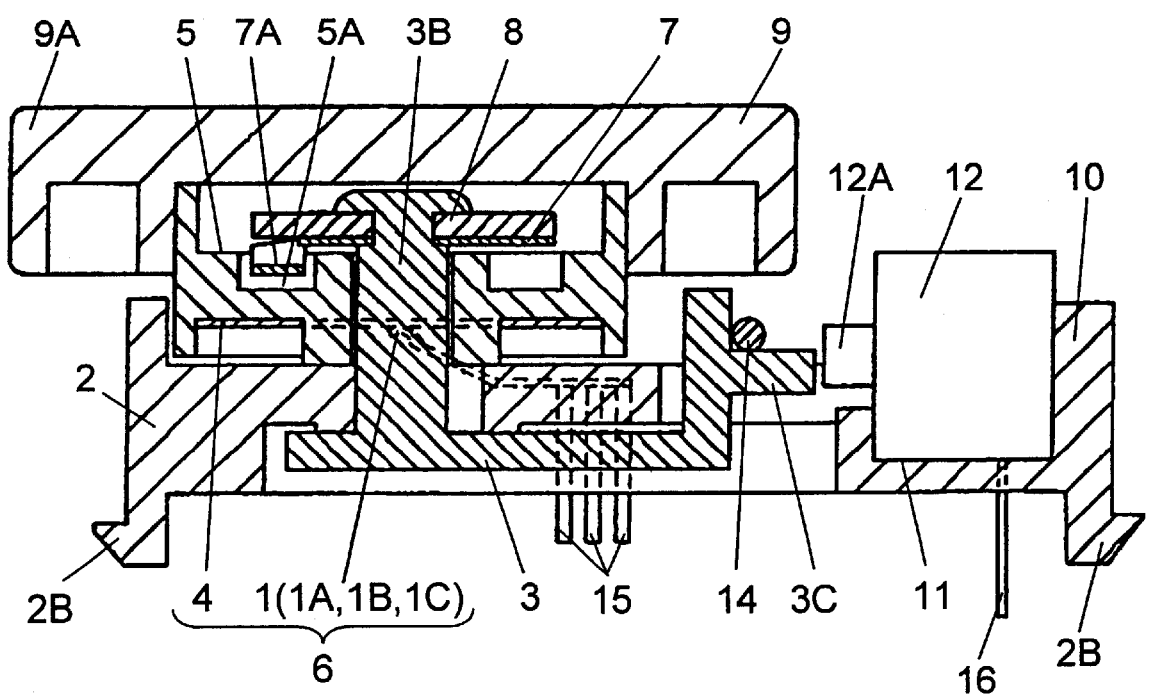
FIG. 13 is a longitudinal sectional view of the same rotary operating type encoder equipped with a push switch of the prior art.

Communication terminal equipment of a fifth exemplary embodiment of the present invention will be described hereinafter by referring to a general perspective view in FIG. 10.

The communication terminal equipment of the present exemplary embodiment carries a rotary operating type encoder equipped with a push switch of the first exemplary embodiment in a manner that an entire upper surface of an operating knob 39, i.e. an operating body, is exposed and a peripheral rim 52 of the operating knob 39 is protruded from an upper surface 51A and a side surface 51B adjoining to it on a main body 51. This communication terminal equipment assigns output signals produced during a rotary manipulation and a depressing manipulation of the rotary operating type encoder equipped with a push switch individually for a data retrieval and a determination function (or an execution function), in the same manner as in the case of the third exemplary embodiment. Furthermore, since other parts are also same as those of the third exemplary embodiment, their description will be omitted.

In operating the communication terminal equipment of this present exemplary embodiment, data is retrieved by rotating the operating knob 39 with a force applied in a tangential direction to the peripheral rim 52 protruding from the side surface 51B, or by depressing an upper peripheral surface from above the operating knob 39. A center portion on the upper surface of the operating knob 39 is then depressed to determine or execute a desired data. Since this communication terminal equipment provides for two different ways of making the rotary manipulation, an operator can choose any of them according to his preference.

A similar effect can be anticipated, as needless to note, even if the communication terminal equipment of the present exemplary embodiment carries a rotary operating type encoder equipped with a push switch of the second exemplary embodiment in the same way.

INDUSTRIAL APPLICABILITY

The present invention, as described above, realizes a structure of a push and rotary operating type electronic device composed within a small projected area, yet it is capable of being operated with a force applied to different positions during a rotating manipulation and a depressing manipulation, and that it is less liable to an erroneous manipulation. The present invention offers an advantageous effect of easily realizing communication terminal equipment having a good operability, a small size, and light weight, by employing this electronic device.

What is claimed is:

1. A push and rotary operating type electronic device comprising:

a case having an opening on top, provided with a first stationary contact for a push type component in a center of a bottom surface of said case and a second stationary contact for a rotary type component at a peripheral of said first stationary contact; portion of said first stationary contact;

a push type movable contact disposed above said first stationary contact for constituting said push type component in combination with said first stationary contact;

a movable contact body including a cylindrical portion having a central through hole of a non-circular shape, said cylindrical portion is rotatably supported, said movable contract body provided with a rotary type movable contact for contacting with said second stationary contact, on an underside surface of a flange portion of said cylindrical portion, said movable contact body constituting said rotary type component in combination with said second stationary contact;

an actuator inserted in said central through hole in said cylindrical portion of said movable contact body and supported therein in a manner so that said actuator is independently movable vertically, while also rotatable conjunctly with said movable contact body, for actuating said push type component when depressed downward;

an operating body of a discoidal shape having a connecting portion to said actuator in a center of an underside surface of said case; and a cover having a flat portion for covering said opening on top of said case, and a bearing hole for rotatably supporting said cylindrical portion of said movable contact body in a center of said flat portion, wherein a predetermined clearance is provided at least between the central through hole in said cylindrical portion of said movable contact body and a periphery of said actuator inserted and supported thereby;

said operating body is provided on an underside surface near a perimeter thereof with an annular rib in concentricity to a rotational center of said operating body, with a predetermined space from said flat portion of said cover; and said operating body tilts and rotates, while sliding on said flat portion of said cover with a lower edge of said annular rib corresponding to a depressed portion of said operating body, when said operating body is rotated while an upper peripheral surface thereof is depressed downward.

2. Communication terminal equipment, wherein the push and rotary operating type electronic device as claimed in claim 1 is mounted in a manner that a peripheral portion of said operating body protrudes from one surface of a main body of said communication terminal equipment, and an upper center surface of said discoidal operating body locates in an opening provided in another surface adjoining said one surface.

3. The communication terminal equipment according to claim 2 wherein the upper center surface of said discoidal operating body protrudes from the opening provided in said another surface of said main body.

4. The communication terminal equipment according to claim 3, comprising:

a control section for accepting a number of manipulations for communication;

a memory unit for storing a plurality of data for communication; and a selection/determination unit comprising (i) a retrieving unit for retrieving a desired data among data stored in said memory unit using a first output signal obtained by a rotary manipulation of said operating body of said push and rotary operating type electronic device, and (ii) a determination unit for determining a data selected with said retrieving unit using a second output signal obtained by a manipulation for shifting downwardly said actuator of said push and rotary operating type electronic device.

5. The communication terminal equipment according to claim 2, comprising:

a control section for accepting a number of manipulations for communication;

a memory unit for storing a plurality of data for communication; and a selection/determination unit comprising (i) a retrieving unit for retrieving a desired data among data stored in said memory unit using a first output signal obtained by a rotary manipulation of said operating body of said push and rotary operating type electronic device, and (ii) a determination unit for determining a data selected with said retrieving unit using a second output signal obtained by a manipulation for shifting downwardly said actuator of said push and rotary operating type electronic device.

6. A push and rotary operating type electronic device comprising:

a case having an opening on top, provided with a first stationary contact for a push type component in a center of a bottom surface of said case and a second stationary contact for a rotary type component at a peripheral portion of said first stationary contact;

a push type movable contact disposed above said first stationary contact for constituting said push type component in combination with said first stationary contact;

a movable contact body including a cylindrical portion having a first central through hole of a non-circular shape, said cylindrical portion is rotatably supported, said movable contact body provided with a rotary type movable contact for contacting with said second stationary contact, on an underside surface of a flange portion of said cylindrical portion, said movable contact body constituting said rotary type component in combination with said second stationary contact;

an operating body of an annular shape having a through hole in a center thereof, and a connecting portion inserted in said central through hole of said movable contact body and supported therein on an underside surface of said operating body;

an actuator inserted in said through hole in said operating body and supported therein in a manner to be vertically movable, for actuating said push type component when an upper end exposing above an upper surface of said operating body is depressed downward; and a cover having a flat portion for covering said opening on top of said case, and a bearing hole for rotatably supporting said cylindrical portion of said movable contact body in a center of said flat portion.

7. The push and rotary operating type electronic device according to claim 6, wherein:

a predetermined clearance is provided at least between the through hole in the center of said annular operating body and a periphery of said actuator inserted and supported thereby;

said operating body is provided on an underside surface near a perimeter thereof with an annular rib in concentricity to a rotational center of said operating body, with a predetermined space from said flat portion of said cover; and, said operating body tilts and rotates, while sliding on said flat portion of said cover with a lower edge of said annular rib corresponding to a depressed portion of said operating body, when said operating body is rotated while an upper peripheral surface of said operating body depressed downward.

8. Communication terminal equipment, wherein the push and rotary operating type electronic device as claimed in one claim 4 and claim 7 is mounted in a manner that a peripheral portion of said operating body protrudes from one surface of a main body of said communication terminal equipment, and said actuator locates in an opening provided in another surface adjoining said one surface.

9. The communication terminal equipment according to claim 8 wherein said actuator protrudes from the opening provided in said another surface of said main body.

10. The communication terminal equipment according to claim 9, comprising:

a control section for accepting a number of manipulations for communication;

a memory unit for storing a plurality of data for communication; and a selection/determination unit comprising (i) a retrieving unit for retrieving a desired data among data stored in said memory unit using a first output signal obtained by a rotary manipulation of said operating body of said push and rotary operating type electronic device, and (ii) a determination unit for determining a data selected with said retrieving unit using a second output signal obtained by a manipulation for shifting downwardly said actuator of said push and rotary operating type electronic device.

11. The communication terminal equipment according to claim 8, comprising:

a control section for accepting a number of manipulations for communication;

a memory unit for storing a plurality of data for communication; and a selection/determination unit comprising (i) a retrieving unit for retrieving a desired data among data stored in said memory unit using a first output signal obtained by a rotary manipulation of said operating body of said push and rotary operating type electronic device, and (ii) a determination unit for determining a data selected with said retrieving unit using a second output signal obtained by a manipulation for shifting downwardly said actuator of said push and rotary operating type electronic device.

12. The push and rotary operating type electronic device according to one of claims 1–7, wherein said operating body is provided on an upper surface near a perimeter thereof with ditches and ridges for a tip of a finger to catch during manipulation.

13. Communication terminal equipment, wherein the push and rotary operating type electronic device as claimed in claim 12 is mounted in a manner that at least an upper surface of said operating body is exposed entirely on one of surfaces of main body thereof.

14. The communication terminal equipment according to claim 13, comprising:

a control section for accepting a number of manipulations for communication;

a memory unit for storing a plurality of data for communication; and a selection/determination unit comprising (i) a retrieving unit for retrieving a desired data among data stored in said memory unit using a first output signal obtained by a rotary manipulation of said operating body of said push and rotary operating type electronic device, and (ii) a determination unit for determining a data selected with said retrieving unit using a second output signal obtained by a manipulation for shifting downwardly said actuator of said push and rotary operating type electronic device.

15. Communication terminal equipment wherein the push and rotary operating type electronic device as claimed in any one of claims 1–7 is mounted in a manner that at least an upper surface of said operating body is exposed entirely on one of surfaces of a main body thereof.

16. The communication terminal equipment according to claim 15, comprising:

a control section for accepting a number of manipulations for communication;

a memory unit for storing a plurality of data for communication; and a selection/determination unit comprising (i) a retrieving unit for retrieving a desired data among data stored in said memory unit using a first output signal obtained by a rotary manipulation of said operating body of said push and rotary operating type electronic device, and (ii) a determination unit for determining a data selected with said retrieving unit using a second output signal obtained by a manipulation for shifting downwardly said actuator of said push and rotary operating type electronic device.

* * * * *

UNITED STATES PATENT AND TRADEMARK OFFICE
CERTIFICATE OF CORRECTION

PATENT NO. : 6,396,006 B1
DATED : May 28, 2002
INVENTOR(S) : Yokoji et al.

It is certified that error appears in the above-identified patent and that said Letters Patent is hereby corrected as shown below:

Drawings,
Insert -- PRIOR ART -- after Figs. 11-17

Column 12,
Lines 34-35, delete "of said first stationary contact."

Column 14,
Line 42, delete "4" and insert -- 6 --

Column 15,
Line 16, delete "1-7" and insert -- 1, 6, 7 --

Column 16,
Line 11, delete "1-7" and insert -- 1, 6, 7 --

Signed and Sealed this

Twenty-seventh Day of May, 2003

JAMES E. ROGAN
*Director of the United States Patent and Trademark Office*